United States Patent
McColl et al.

(10) Patent No.: US 9,347,439 B2
(45) Date of Patent: May 24, 2016

(54) ELECTRONICALLY CONTROLLED LINEAR PUMP DRIVE

(71) Applicant: Hibar Systems Ltd., Richmond Hill, Ontario (CA)

(72) Inventors: Iain McColl, Markham (CA); Bill Reschke, Richmond Hill (CA)

(73) Assignee: HIBAR SYSTEMS LTD., Richmond Hill, Ontario (CA)

( * ) Notice: Subject to any disclaimer, the term of this patent is extended or adjusted under 35 U.S.C. 154(b) by 0 days.

(21) Appl. No.: 14/421,480

(22) PCT Filed: Jul. 23, 2013

(86) PCT No.: PCT/CA2013/000664
§ 371 (c)(1),
(2) Date: Feb. 13, 2015

(87) PCT Pub. No.: WO2014/026267
PCT Pub. Date: Feb. 20, 2014

(65) Prior Publication Data
US 2015/0219081 A1 Aug. 6, 2015

(30) Foreign Application Priority Data

Aug. 15, 2012 (HU) ..................................... 1200478

(51) Int. Cl.
*F04B 9/02* (2006.01)
*H02K 7/06* (2006.01)
(Continued)

(52) U.S. Cl.
CPC . *F04B 13/00* (2013.01); *F04B 9/02* (2013.01); *F04B 17/03* (2013.01); *F04B 49/12* (2013.01); *H02K 7/06* (2013.01)

(58) Field of Classification Search
CPC .............. F04B 9/00; F04B 9/02; F04B 13/00; F04B 17/03; F04B 49/12; H02K 7/06; H02K 5/00; B65D 83/0011; B65D 83/0016; B05C 17/0103; B05C 17/0133

USPC ........... 417/417, 415, 360; 310/12.31, 90, 91, 310/80, 12.14, 12.19, 20, 15; 222/325, 333, 222/326, 386, 390
See application file for complete search history.

(56) References Cited

U.S. PATENT DOCUMENTS 3,327,826 A * 6/1967 Henschke ........... F16H 25/2015
192/141
4,276,003 A * 6/1981 Perkins ................... E21B 21/01
184/24

(Continued)

FOREIGN PATENT DOCUMENTS

EP   1 182 765 A1   2/2002

OTHER PUBLICATIONS

International Search Report dated Oct. 16, 2013 issued in PCT/CA2013/000664.

*Primary Examiner* — Devon Kramer
*Assistant Examiner* — Nathan Zollinger
(74) *Attorney, Agent, or Firm* — Fitch, Even, Tabin & Flannery LLP

(57) ABSTRACT

Electronically controlled linear pump drive actuator for a dispensing pump has a servo motor unit having a stator with front and rear faces and a central hollow cavity, a rotor coaxially in the hollow cavity with a front portion having a front end with an open central bore and a shaft with a stepped diameter forming a rear extension, front and rear support members respectively for the front and rear faces, a support bearing in the rear member, a front bearing, and a position sensor; a ball screw drive mechanism having a nut connected with the rotor and a screw shaft having a front end section; a hollow cylinder attached to the front member's front end; an actuator member axially moveable in the hollow cylinder with a central rear part fixed to the front end section, and a hollow front part; and a pump plunger adaptor.

9 Claims, 3 Drawing Sheets

(51) Int. Cl.
*F04B 13/00* (2006.01)
*F04B 17/03* (2006.01)
*F04B 49/12* (2006.01)

(56) References Cited

U.S. PATENT DOCUMENTS

| | | | | |
|---|---|---|---|---|
| 5,312,233 A * | 5/1994 | Tanny | ............ | F04B 7/0038 417/316 |
| 5,554,899 A * | 9/1996 | Teramachi | ............ | B25J 9/102 310/20 |
| 5,689,994 A * | 11/1997 | Nagai | ............ | B23Q 1/25 310/80 |
| 6,234,771 B1 * | 5/2001 | Carey | ............ | F04B 17/03 417/360 |
| 6,570,282 B1 * | 5/2003 | Ito et al. | ............ | 310/80 |
| 6,794,779 B2 * | 9/2004 | Ma | ............ | H02K 7/06 251/337 |
| 7,335,003 B2 | 2/2008 | Kingsford et al. | | |
| 7,389,709 B2 | 6/2008 | Zhou | | |
| 7,589,445 B2 * | 9/2009 | Gandel | ............ | H02K 7/06 310/20 |
| 7,597,682 B2 | 10/2009 | Moberg | | |
| 8,020,462 B2 * | 9/2011 | Kobayashi | ............ | F16H 25/2204 74/424.81 |
| 2006/0005645 A1 * | 1/2006 | Zhou | ............ | F16H 25/2204 74/89.34 |
| 2006/0158049 A1 * | 7/2006 | Suzuki et al. | ............ | 310/52 |
| 2006/0203609 A1 | 9/2006 | Danielson et al. | | |
| 2009/0056485 A1 | 3/2009 | Kobayashi et al. | | |

* cited by examiner

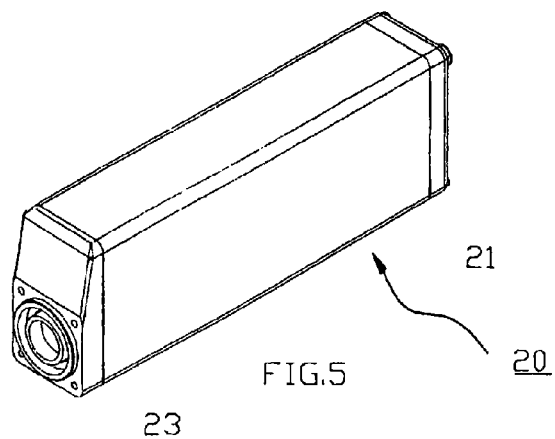
FIG.5
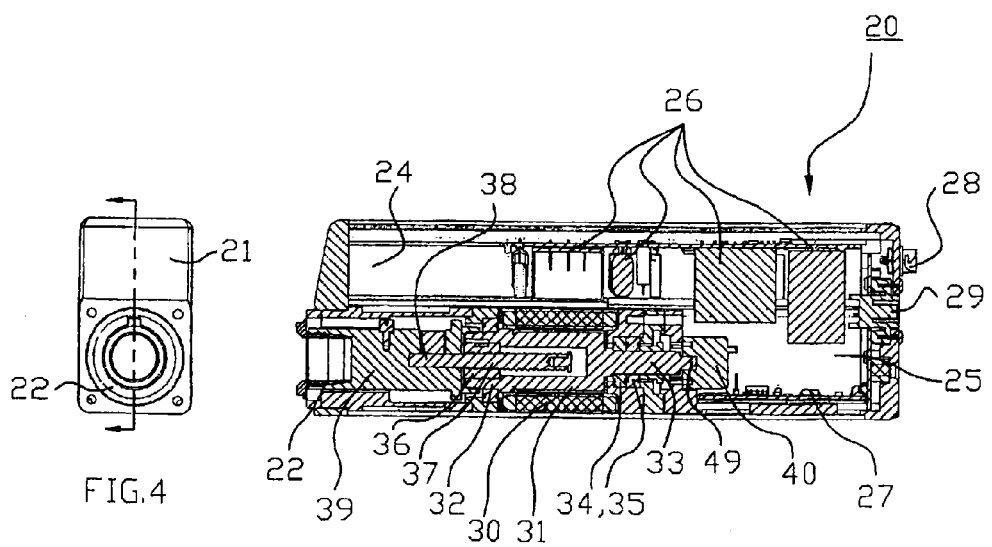
FIG.4
FIG.3

ELECTRONICALLY CONTROLLED LINEAR PUMP DRIVE

CROSS-REFERENCE TO RELATED APPLICATIONS

This Application is a U.S. National Stage Application filed under 35 U.S.C. §371 of International Application PCT/CA2013/000664, filed Jul. 23, 2013, designating the United States, which claims priority from Hungarian Patent Application P1200478, filed Aug. 15, 2012, the complete disclosures of which are hereby incorporated herein by reference in their entirety for all purposes.

FIELD OF THE INVENTION

The present invention relates to an electronically controlled linear pump drive actuator for operating a fluid dispensing pump with a substantially uniform degree of precision and stability within a wide range of dispensing volumes and loads.

BACKGROUND OF THE INVENTION

Precision liquid dispensing pumps are used in many environments, in which precisely measured quantities of a liquid are required to be dispensed. Examples of such applications are found in the food, cosmetics, pharmaceutical, chemical and battery industry.

A linear liquid dispensing pump is described in U.S. Pat. No. 5,312,233. Here the piston of the pump is reciprocating, rotating. Rotation is effected through a flexible coupling means connected to the rotor of a step motor. The coupling means allows slight alignment differences between the axis of the rotor and of the piston. A different example for an apparatus with servo-motor driven pumps is described in U.S. Patent Publication 2006/0203609. In both of these prior art designs the servo-motor driven pump and a dispensing unit operated by the reciprocal movement of the pump constitute a single mechanical unit. The size of the apparatus is increased by the fact that the same reciprocating actuator can be adapted to several cylinder-plunger pump units, which are all integrated in the combined pump and dispensing units. This property renders cleaning long and difficult and it unnecessarily affects the linear actuator within the apparatus. Furthermore, the design has an increased length and volume and it is difficult to handle.

A different approach is applied in a prior art metering pump with servo-motor driven actuator which is the Model 2S available from Hibar Systems Limited of Richmond Hill, Canada. This system is schematically illustrated in FIGS. 1 and 2. The main part is a servo-motor driven linear actuator 20 which has the task of providing a very accurate linear displacement of an actuator element with a cylindrical hollow frontal bore. Apart from its precisely controlled guided linear axial movement, the actuator element is not rotating or moving in any other direction. The front portion of the actuator assembly 20 has a releasable adaptor socket to which a separate dispensing unit 10 can be attached. The dispensing unit 10, when coupled to the socket of the main actuator assembly 20 has a plunger which is inserted in the cylindrical frontal bore of the actuator so that it follows the precise reciprocating linear motion thereof. The plunger of the dispensing unit 10 co-operates with a cylinder and in each period of the movement it meters a precisely adjusted volume of a liquid inserted in the cylinder. The releasable connection between the main actuator assembly 20 and the dispensing unit 10 makes it possible that a great variety of dispensing units designed for the metering of liquids of differing viscosities and/or volumes can be connected to the same actuator unit, and the user has the freedom of choosing the dispensing unit that fits most to his actual dispensing task.

The problem with this separate servo motor drive assembly lies mainly in its comparatively large size, and for its perfect operation respective separate voluminous power supply unit and a control unit has to be used, which are all wired together to retain functionality. Furthermore, in this known actuator the servo motor rotates the shaft of a ball screw unit, which has a cooperating ball screw nut guided for linear movement in the actuator element, therefore the nut cannot rotate.

In case of servo motor driven linear actuators the most widely-spread solution is the use of customary built servomotors. The rotation movement is generally converted into a linear movement by means of a ball screw system comprising a shaft and a nut, wherein a separate coupling element is used that connects the rotor of the motor with the rotating shaft of the ball screw unit. Here the length of the rotor, of the coupling element and that of the ball screw are added, which result in rather long geometric dimensions, especially length.

There are several known servo-motor drives that can be used as linear actuators. One example which does not use a separate coupling element between the rotor and the ball screw is described in US 2009/0056485 A1 of Kobayashi et al., wherein the rotor of the servo motor is mechanically connected to an axial ball screw shaft so that sharp steps are made at the rear extension of the ball screw shaft, and the rotor has a conformingly stepped hollow interior for receiving the end of the ball screw shaft. The shaft is attached to the rearmost portion of the rotor. The front portion of the rotor has a larger diameter hollow opening so that a non-rotating ball screw nut travels in and out of this opening, and this linearly moving nut constitutes the actuator element of the drive. A problem lies in the very thin and long design of the ball screw shaft and of the conforming hollow design of the rotor, which provides a degree of instability and a feature of difficult mass-balancing. A further problem lies in the weight of the rotating ball screw which, when attached to the rotor, leads to an effective increase in the weight of the rotating components and therefore correspondingly higher rotor inertias. Since satisfactory operation of the dispensing pump requires rapid acceleration, deceleration and changes in rotation direction of the servomotor rotor, the higher rotor inertia becomes a critical speed limiting factor. A further problem is connected with the travel of a large non-rotating nut in the hollow opening of the rotor, where the guiding is difficult to solve. The servo motor used is of a conventional type, which has standard bearing design for rotational movement and such bearings are less capable of enduring axial forces that are inevitably present in linear actuators. In that design the axial distance between the front and rear bearings of the rotor is short, and the rear bearing has a decreased diameter owing to the narrow design of the rotor end portion. By such constructional limitations the axial forces and any axial misalignment can increase the load acting on the bearings decreasing thereby their life time and the accuracy of the control.

A similar design is shown in U.S. Pat. No. 8,020,462 B2 issued also to Kobayashi et al., wherein the difference compared to the previous design lies in that the ball screw shaft can be connected in the hollow cavity of the rearmost portion of the rotor in a releasable way.

A cylinder servomotor is described in EP 1 182 765 A1, which is a self-contained unit which has a linearly reciprocating shaft that constitutes the output element. In this document the servomotor is built integrally with a ball screw drive, wherein the nut is fixed in the rotor and the threaded shaft is guided for linear movement. The servo motor has a front portion that comprises a radial bore in which two balls are spring-biased to a linear groove tooled in the threaded front portion of the ball screw shaft. The balls are pressed against the groove with V-shaped cross section, and the balls have the task of preventing twisting of the shaft. The threads on the shaft intersect with the groove, and the associated guiding problems are solved by choosing an appropriate size of and distance between the balls. While such a system works fine in case of comparatively small axial loads, the twisting forces acting on the guiding element increases with load. In case of higher twisting forces, the walls of the groove tend to push the balls out of the grove, and because of the spring-bias the balls can move in radial direction. Any error caused thereby will decrease the accuracy of the angular position-adjustment of the system. Similar angular position errors might take place when the balls cross the threading, because here the friction area between the grooves and the balls will change causing thereby an angular play.

A further problem connected with this design is that the bearings of the servo motor are not designed to resist higher axial forces. Furthermore, the ball screw drive is not able to provide a correct and efficient liner guide for the actuator shaft being the extension of the ball screw shaft, as the axial length of the ball screw is small. If such an actuator is coupled to any device which requires axial movement, a very accurate axial coupling or a separate coupling element is needed. Separate coupling elements (as described earlier) decrease the accuracy of angular position-control.

The actuator according to this prior document is not appropriate for being used for liquid dispensers, which require the same precision and accuracy within a wide range of different loads.

When a separate actuator is used for dispensing pumps just like in case of the aforementioned HIBAR 2S actuator, the design of the dispensing pump operated by the actuator can be freely chosen as long as it can be connected to the actuator. It is preferable if the actuator can be used for dispensing pumps working with liquids having a wide range of viscosity values, and wherein such dispensing pumps should be able to dispense precisely adjusted but different liquid volumes. When the output volume dispensed at a single stroke is increased, and especially if a liquid of higher viscosity should be dispensed, the movement of the plunger of the pump unit will require higher forces that present increased axial load that should be overcome by the force of the actuator. In case of higher axial loads, there will be proportionally high torques that the rotating ball screw shaft in the actuator unit should transmit to the rotor of the servo motor.

If such a type of actuator as described in the Kobayashi et. al publications is used for dispensing pumps allowing the use of a wide range of viscosities and dispensing volumes, then in case of higher loads a resilient slight twisting of the ball screw shaft and of the rotor will take place under the effect of the torque presented by the load. This is true, because the magnetic forces of the servo motor will act to the front portion of the rotor, and a step-wise narrowing rear part of the rotor is fixed to the rear end of the ball screw shaft. Under the effect of the torque the rotor will get slightly twisted, and the great length of the thin ball screw shaft between its rearmost attachment and the ball screw nut will also be twisted by a higher extent. It is customary, that a position encoder is attached to the rearmost portion of the rotor, and the position control of the servo motor is based on the angular position of this rearmost part of the rotor. Under the effect of the torque generated by the load of the pump, there will be a position error in the control owing to the angular displacement of the shaft and of the rotor. This will decrease precision of the dose-adjustment i.e. leads to a decreased accuracy when the pump requires higher forces. In other words, such actuators cannot be used for dispensing pumps with wide range of viscosities and/or dosage volume with the same degree of precision.

This means that prior art actuators of the aforementioned design have not only increased length but also had higher rotational inertias and a decreased precision, the degree of which was dependent on the load requirement of the attached dispensing pump.

When one wishes to decrease the overall size of the actuator system, a further problem will arise, namely how to dissipate the heat generated by the motor, especially when it is operated through long periods of time.

OBJECTS OF THE INVENTION

The main objective of the present invention is to provide a linear actuator for operating a releasably attached fluid dispensing pump with a substantially uniform degree of precision and stability within a wide range of dispensing volumes and loads.

A further object is to provide this actuator with a factory set home position calibration that is never lost during the lifetime of the apparatus. The property requires high accuracy in position control.

SUMMARY OF THE INVENTION

According to the invention an electronically controlled linear pump drive actuator for operating a dispensing pump has been provided which has a substantially uniform degree of precision and stability within a wide range of dispensing volumes and loads, comprising:

a servo motor unit that comprises:
  a stator with a central hollow cavity defining a longitudinal axis, and front and rear faces;
  a rotor extending coaxially in the hollow cavity of the stator for rotation around the axis and has a front portion that has a central bore open at the front end and has a predetermined length, the front end of the front portion of the rotor extends over in frontal direction to the front face of the stator; and a rear shaft with a stepped diameter forming a rear extension of the front portion, the rear shaft extends over the rear face of the stator in rearward direction;
  respective front and rear support members supporting and are attached to the front respectively rear faces of the stator to form a single stable mechanical assembly therewith;
  at least one support bearing in the rear support member with inner rings fixed on the stepped rear shaft of the rotor past the rear face of the stator, support bearings are designed to take and resist substantial axial loads;
  a front bearing placed between the front support member and forwardly extending part of the rotor; and
  a position sensor sensing the actual angular position of the rear shaft of the rotor;
a ball screw drive mechanism extending around the axis and has a ball screw nut and a ball screw shaft guided in the ball screw nut, the ball screw nut is arranged in and attached to a front end portion of the front portion of the rotor; the ball screw shaft has a threaded rear portion;
a hollow cylinder attached to a front end of the front support member that extends in forward direction around the axis;

an actuator member guided for axial movement in the hollow cylinder and has a central rear part fixed to a front end section of the ball screw shaft for being moved in forward and backward direction by the ball screw shaft, and a hollow front part;

a pump plunger adaptor fixed in the hollow front part of the actuator member for releasable attachment of a plunger element of the dispensing pump, wherein, rotation of the rotor in either direction causes the forward or rearward linear movement of the ball screw shaft together with the actuator member and during the reciprocating movement the rear end of the ball screw shaft is moving in and out of the central bore of the front portion of the rotor.

This design has the advantage that a rigid mechanical unit is formed, wherein the axial load acting on the rotor are taken by specially designed ball bearings, and the long ball screw shaft is precisely guided, because the actuator member with which it is connected is precisely guided in the hollow cylinder that forms a common integral unit with the servo motor system. The holding of the long shaft is made with elements between which there is a large distance, thus the angular errors will be at minimum.

A preferred embodiment further comprises a rigid, elongated housing made of a material with good heat conductivity, the housing defined respective first and a second elongated compartments that extend beside each other; and the first compartment encircles and holds the hollow cylinder together with the servo motor unit to increase the mechanical stability thereof. In addition to the increased stability, the housing contributes substantially to heat dissipation.

The mechanical dimensions can be reduced if the servo motor unit comprises a power supply and a control system, wherein at least parts of the power supply and parts of the control system are arranged in the second compartment of the housing.

It is preferred, furthermore, if the position sensor comprises an encoder arranged behind the rear shaft of the rotor and a moving part is attached to the rearmost part of the rear shaft of the rotor, the moving part together with the encoder are capable of sensing any actual angular position of the rotor.

The resistance against axial load can be increased if the rear ball bearing is realized by two ball bearings arranged axially behind each other.

The design gets simpler if the ball screw shaft has a non-threaded cylindrical front portion which is fixed and attached to the actuator member.

The linear guiding can be realized preferably if the hollow cylinder has a linear cam path and the actuator member is connected to a guiding element for sliding and being guided along the linear cam path.

In a preferable embodiment the encoder is an electro-mechanical device that never loses any position information, thereby enables a one-time factory calibration. The actuator when designed as summarized here has a higher degree of precision, can operate a liquid dispensing unit capable of using liquids of differing viscosities and can dispense adjustable volumes of such liquids. The actuator is a self contained single unit with reduced sizes and volume and operates in a stable and reliable manner.

DESCRIPTION OF THE DRAWINGS

The invention will now be described in connection with preferable embodiments thereof, wherein reference will be made to the accompanying drawings. In the drawing:

FIG. 3 is a sectional elevation view of the linear actuator to a preferred embodiment;

FIG. 4 is the front view of the linear actuator of FIG. 3;

FIG. 5 is a perspective view of the same linear actuator; and

DESCRIPTION OF THE PREFERRED EMBODIMENTS

Figure 1:
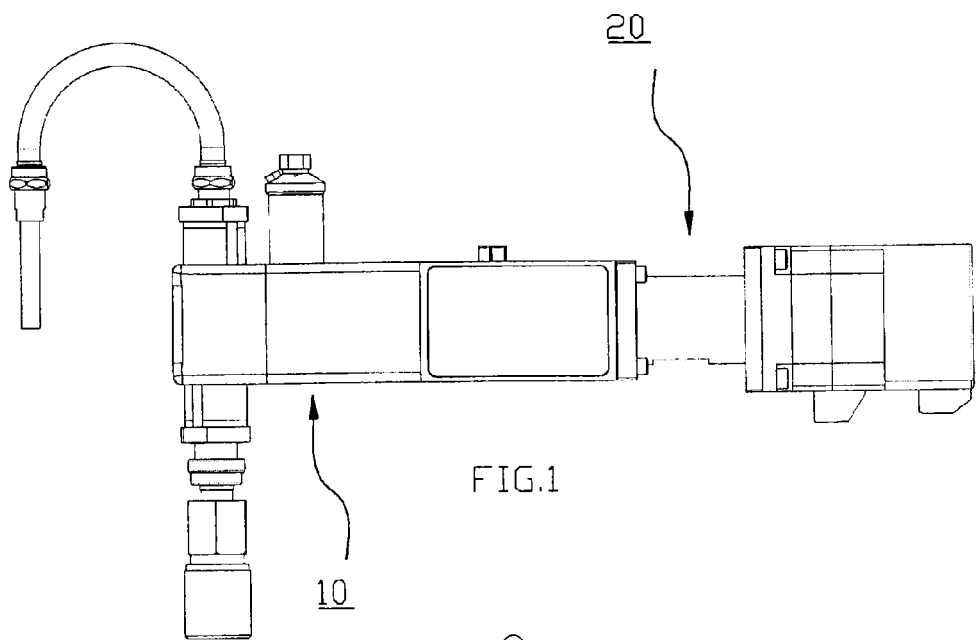
FIGS. 1 and 2 a side and front view of a prior art servo-motor driven metering pump model 2S available from Hibar Systems Limited.
Figure 2:
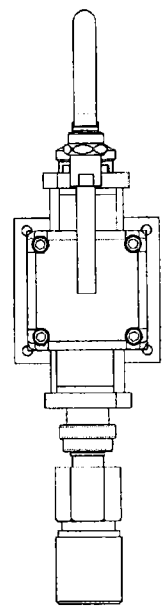

In FIGS. 1 and 2, as already described, a prior art metering pump with servo-motor drive Model 2S available from Hibar Systems Limited of Richmond Hill, Canada is shown. The footprint dimensions for this pump are 12.90×2.36 inches [327.6×59.9 mm] with the pump head assembly that constitutes the dispensing unit 10 measures 4.00 inches [101.6 mm] in length and the servo-motor drive linear actuator 20 is 8.90 inches [226.1 mm] long. To operate this pump, power and electronics controls have to be provided externally, which is accomplished by cabling up the rear end of the pump to an external control box of substantial size and weight.

FIGS. 3 to 5 shows the cross-section, the front view and a perspective view of a preferred embodiment of the linear actuator 20 according to the invention which can also be referred to as an integrated servo-motor driven pump (ISP) drive. The actuator 20 has a substantially rectangular, elongated housing 21 which has a pump plunger adaptor 22 at its front face 23 for connection to the same or similar dispensing unit 10 as shown in FIG. 1.

In the elevation cross section view of FIG. 3 it can be seen that the inner space of the housing 21 is divided into two parts 24, 25 extending parallel to each other, wherein the larger lower part 25 has the main task of holding the mechanical elements of the linear actuator 20, that itself constitutes an integral self-holding mechanical unit. This unit slid with a tight fit in the first part 24 of the housing 21, so that the housing 21 can increase the rigidity of the mechanical unit, and at the same time the high heat conductivity of the housing 21 made preferably of an appropriate metal acts as a heat sink for the mechanical unit and conducts away heat generated and owing to its large surface this heat will be safely dissipated. The second part 25 of the housing is used for holding parts 26 of the electronic power supply and of the control circuits. A small space can be provided behind the first housing part 24 for certain parts 27 of the motor control electronics. At the rear faceplate of the housing 21 a power connector 28 and one or more standard input/output connector 29 are arranged. The control can be implemented also by known wireless means that might render the use of the I/O connector 29 unnecessary.

The aforementioned mechanical unit comprises a servo motor with a stator 30 and a rotor 31. Except for the mechanical design of the rotor 31 the motor can be a standard servo motor. The rotor 31 has a front portion 32 provided with a cylindrical hollow cavity and a stepped cylindrical rear shaft portion 33 extending well behind the stator 30 and forming the rear rotor shaft around which support bearings 34, 35 are arranged and connected to the stationary rear part connected to the stator 30. The support bearings 34, 35 are of the type that can also take axial load. The rear rotor shaft 33 differs substantially from the rear part of the rotor shaft of the previously referred Kobayashi et. al design, because it does not have a central hollow opening and it is therefore mechanically more stable, and the bearings 34, 35 are wider and also stronger. A further difference lies in that the rotor 31 has a much shorter overall length than at Kobayashi, as there the rotor extended in a great length with reduced diameter in forward direction. Behind the rear shaft 33 of the rotor an encoder 40 is arranged, which is needed for the accurate positioning and control of the motor. The encoder 40 comprises preferably an optical sensor that is arranged opposite to a rear disc element 49 (see FIG. 6) attached to the end portion of the rear shaft 33, wherein the disc 49 alternatingly comprises optically transparent and non-transparent segments, and the encoder 40 accurately senses and counts the number of segments both in forward and backward rotation of the rotor. The encoder 40 and the optical element 49 attached to the rotor can be realized by any sufficiently accurate custom-made positions sensor assembly of any know design. By means of the encoder 40 and the schematically illustrated, per se known motor control circuits the accurate positioning of the actuator can be achieved.

In the front portion of the hollow cavity of the front portion 32 of the rotor 31 a ball screw nut 36 is arranged and fixed to this front portion 32 in a coaxial arrangement therewith, so that the ball screw nut 36 forms a common unit with the rotor 31 and it rotates together with it. A central axially extending ball screw shaft 37 is arranged in and being driven by the ball screw nut 36. The rotation of the nut 36 forces the shaft 37 therein to move in axial direction forward and backwards, depending on the sense of direction of the rotation. The hollow cavity in the front part 32 of the rotor 31 provides sufficient room for this linear motion of the shaft 37. The ball screw shaft 37 has an increased length and its front part 38 is cylindrical (without the threading of the ball screw) and it is attached to an actuator member 39 which is guided for linear axial movement.

Figure 6:
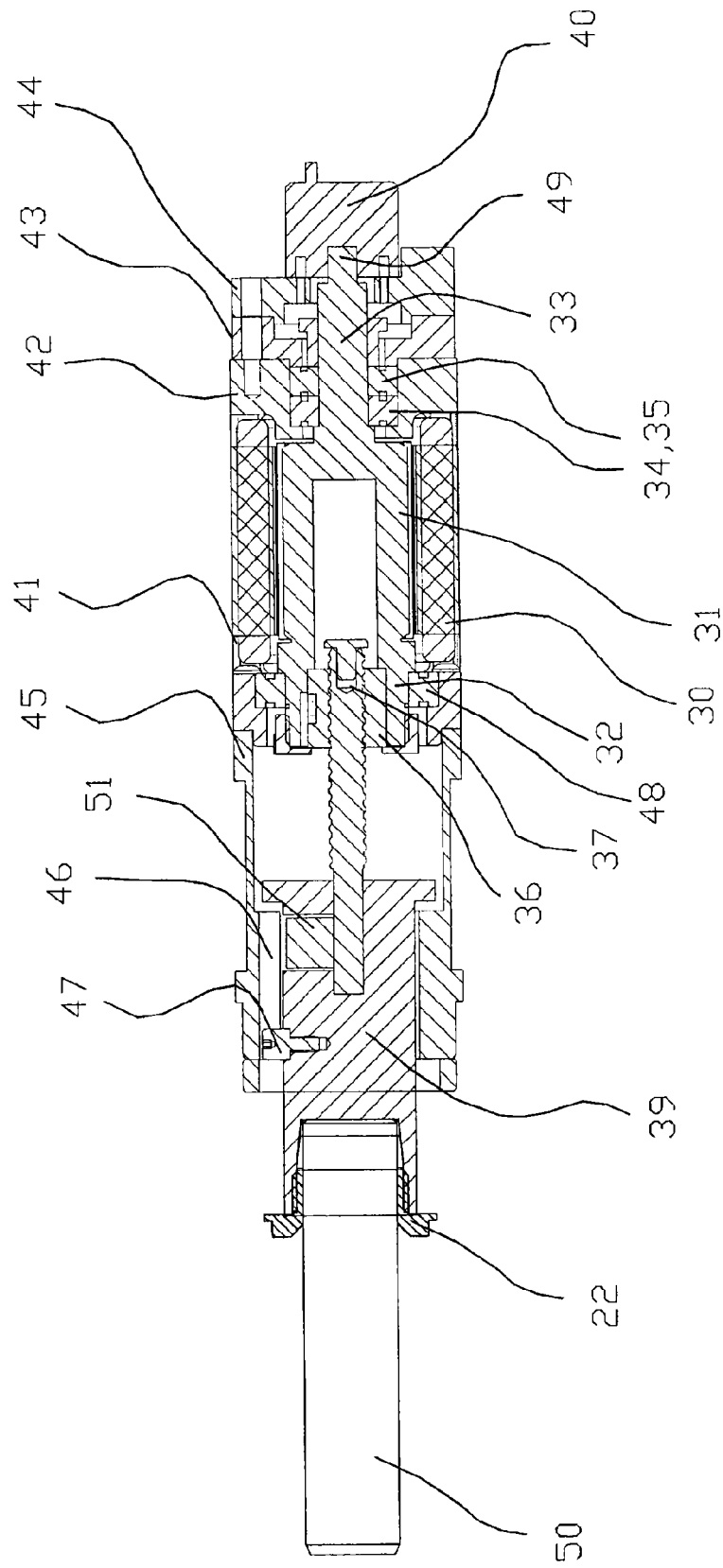
FIG. 6 is an enlarged sectional view of the mechanical units of the same linear actuator.

Reference is made now to FIG. 6 which shows the mechanical unit of FIG. 3 in an enlarged sectional view. The elements described in the preceding paragraph can be better observed in this enlarged drawing. The whole unit forms a single compact cylindrical part, wherein the front and rear faces of the stator 30 are mechanically fixed to respective front and rear support members 41, 42. For the sake of providing access to the parts of the encoder 40 two further members 43, 44 are releasably attached to the rear support member 42. The front part of the front support member 41 has a stepped design, and it is attached to a long hollow cylinder 45 that serves as housing for the reciprocating actuator 39. A cam path 46 is provided in the interior of the cylinder 45, and a guiding element 47, attached to the body of the actuator 39, is sliding along the cam path 46. In this way the actuator 39 together with the ball screw shaft 37 cannot rotate but the rotation of the ball screw nut 36 causes both the shaft 37 and the actuator 39 to slide in axial direction. Element 51 serves to fix the connection between the end portion of the ball screw shaft 37 in the body of the actuator 39. While the unit described is sufficiently stiff and rigid, the unit is also attached at several locations to the housing, 21 that further increases stability of the assembly.

As described earlier, the rear part of the rotor 31 is kept by the bearings 34, 35, and the mechanical support for the front part of the rotor 31 is provided by a further bearing 48 fixed between a stepped outer portion of the front part of the rotor 31 and the interior of the support member 41.

The operation of the actuator 20 is easy to understand. In FIG. 6 the actuator 20 is in its outermost position. When reaching this position, the control circuits will not allow the motor to rotate further in forward direction, and at least by this position (or earlier) the direction of rotation must be reversed. The innermost position is determined by the length of the hollow cavity in the rotor 31. Slightly before abutment of the inner end of the ball screw shaft 37 with the rear wall of this cavity, the reverse rotation of the motor should be stopped. Between these two extreme positions any limited partial displacement of the actuator 39 can be adjusted. The encoder 40 provides exact position-data to the control circuit between these two limit positions, and it is electronically resolved that the actuator can be moved according to any predetermined program.

It can be observed that the rear portion of the rotor (behind the stator 30) is not exposed to any load, therefore no torque acts on this rear part of the rotor extending behind the stator and the rear disc 49 opposite of the encoder 40, therefore the encoder 40 can accurately determine the position of the rotor 31, i.e. the angular twisting effect acting on the narrow rear part of the rotor present in the prior art designs is perfectly eliminated.

Furthermore, the ball screw nut 36 is fixed to the rotor 31 and the nut directly transmits the torque acting thereon to the rotor 31, where the rotor has the largest diameter. Well dimensioned ball screw drives can transmit higher loads without any angular play. It can be observed that the section of the non-rotating ball screw shaft 37 defined between the actuator member 39 and the ball screw nut 36 is short, and this shaft has a larger diameter, than the shafts of the afore described prior art solutions, and its angular position is fixed, therefore it is not capable of any noticeable angular displacement under the effect of any torque transmitted thereon by the ball screw nut 36. This all means that the precision of the adjustment and control of this preferred embodiment is largely independent from the acting axial load; therefore the actuator 20 can be used for metering pumps 10 used for a wide range of liquid viscosities and dispensing volumes.

Apart from this feature the accuracy and stability of the system is very high. This is caused by the suggested design of the rotor 31, where the rotor 31 is held by a front and two rear ball bearings 48 and 34, 35 being at a sufficient axial distance from each other, and additionally by the high rigidity of the design. Further advantages lie in the stable connection between the rotor and the ball screw nut 36 occurring at a large diameter, whereby the nut causes the shaft 37 to move in axial direction and not in an opposite way as it was customary in prior art designs. There is no need for any separate coupling between the ball screw and the actuator, which decreases the overall length of the system. The comparatively short length of the ball screw nut 36 allows slight alignment errors, however, the coaxial and very stable connection between the motor and the hollow cylinder 45 that supports the actuator 39 enables elimination even the slightest alignment errors, therefore the actuator 39 smoothly slides along its guided path.

In FIG. 6 a plunger element 50 of the dispensing unit 10 (separately not show here) has been shown as being inserted in the pump plunger adaptor 22 recess. This illustrates that in operation when a dispensing unit 10 is attached to the linear actuator 20, the plunger 50 of the unit can be temporarily fixed to the actuator member 39, and any preset linear displacement can be caused for the plunger 50.

The linear actuator 20 according to the present invention has a simple but very precise and reliable design, it is shorter than prior art similar units and it also includes all the electronic elements required to its movement and adjustment, and control can be made either through standard cable connection or by means of any wireless connection, therefore it can be adapted to several manufacturing lines and to very different dispensing units.

The actuator system according to the present invention provides a very stable guide to the plunger attached thereto, because the rigid housing provides further reinforcement for the elongated structure that would otherwise be exposed to vibrations owing to any improper balance of the rotating parts including that of the rotor. The increased mechanical stability enables finer control and adjustment and increases the overall precision of the system. By using the housing with the divided inner space not only the stability has been increased but sufficient space is provided for placing the power supply and the control system. The good mechanical connection between the actuator assembly and the housing can lead away heat generated by the motor. The compact actuator system built entirely in a single housing has eliminated the need for handling several separate units connected with wiring, which itself alone would decrease reliability. The wireless control provides for easy and comfortable use.

A further benefit of the invention is the ability to be 'factory calibrated' without the loss of the calibration information. The prior art servo pumps require recalibration after each maintenance or physical change of the setup as the electronics loses its 'homing' information. With the actuator 20 of the present invention, the encoder 40 is an electro-mechanical device that never loses any position information, thereby enabling a one-time factory calibration without the need to recalibrate as the servo drive and electronic controls are permanently integrated.

The invention claimed is:

1. An electronically controlled linear pump drive actuator for operating a fluid dispensing pump with precision and stability within a wide range of dispensing volumes and loads, comprising:
    a servo motor unit that comprises:
    a stator (30) with a central hollow cavity defining a longitudinal axis, and front and rear faces;
    a rotor (31) extending coaxially in the hollow cavity of said stator (30) for rotation around said longitudinal axis, the rotor (31) having a front portion (32) that has a front end, a central bore open at the front end, and a predetermined length, both said front end and said front portion (32) of the rotor (31) extending in a frontal direction beyond said front face of said stator (30); and a rear shaft (33) with a stepped diameter forming a rear extension of said front portion (32), said rear shaft (33) extending in a rearward direction beyond said rear face of the stator (30);
    respective front and rear support members (41; 42, 43, 44) supporting and being attached to respective front and rear faces of said stator (30) to form a single stable mechanical assembly therewith;
    at least one support bearing (34, 35) inside of said rear support member (42) and situated beyond said rear face of the stator in the rearward direction, the at least one support bearing having its inner ring fixed on said stepped rear shaft (33) of said rotor (31), wherein said at least one support bearing is able to take and resist axial loads;
    a front bearing (48) placed directly between said front support member (41) and said front portion (32) of said rotor (31); and
    a position sensor with an encoder (40) sensing the actual angular position of said rear shaft (33) of said rotor (31);
    a ball screw drive mechanism having a ball screw nut (36) and a ball screw shaft (37) guided in said ball screw nut (36), said ball screw nut (36) being arranged in said central bore and attached to said front portion (32) of said rotor (31); said ball screw shaft (37) has a threaded rear portion, extendable to different lengths in said central bore behind said screw nut (36) depending on the momentary angular position of the rotor (31);
    a stationary hollow cylinder (45) attached to a front end of said front support member (41) that extends in the frontal direction around said longitudinal axis;
    an actuator member (39) guided exclusively for axial movement in said hollow cylinder (45) and having a central rear part fixed to a front end section of said ball screw shaft (37) to prevent any angular displacement of said shaft (37) and said actuator member (39) having a hollow front part;
    a pump plunger adaptor (22) fixed in said hollow front part of said actuator member (39) for releasable attachment of a plunger element (50) of said dispensing pump; and
    wherein, rotation of said rotor (31) in either direction causes the frontal or rearward linear movement of said ball screw shaft (37) together with said actuator member (39), and during reciprocation movement the rear end of said ball screw shaft (37) moves in and out of said central bore of said rotor (31).

2. The linear pump drive actuator as claimed in claim 1, further comprising a rigid, elongated housing (21) made of metal, said housing defining respective first and second elongated compartments (24, 25) extending beside each other; said first compartment (24) encircling and holding said hollow cylinder (45) together with said servo motor unit to increase the mechanical stability thereof.

3. The linear pump drive actuator as claimed in claim 2, wherein said servo motor unit comprises a power supply and an integrated control system, wherein components (26) of said power supply and components (27) of said control system are arranged in said second compartment (25) of said housing (21).

4. The linear pump drive actuator as claimed in claim 1, wherein said position sensor comprises the encoder (40) arranged behind said rear shaft (33) of said rotor (31) and a moving part attached to the rearmost part of said rear shaft (33) of said rotor (31), and said moving part together with said encoder (40) are capable of sensing any actual angular position of said rotor.

5. The linear pump drive actuator as claimed in claim 1, wherein said rear support members (42, 43, 44) hold a pair of said support bearings (34, 35) which are arranged adjacent to each other in an axial direction.

6. The linear pump drive actuator as claimed in claim 1, wherein said ball screw shaft (37) has a non-threaded cylindrical front portion which is fixed and attached to said actuator member (39).

7. The linear pump drive actuator as claimed in claim 1, wherein said hollow cylinder (45) has a linear cam path (46) and said actuator member (39) is connected to a guiding element (47) for sliding and being guided along said linear cam path (46).

8. The linear pump drive actuator as claimed in claim 3, wherein said encoder (40) is an electro-mechanical device that never loses any position information, thereby enabling a one-time factory calibration.

9. An electronically controlled linear pump drive actuator for a dispensing pump, the actuator comprising:
    a servo motor unit comprising:
    a stator including a central hollow cavity defining a longitudinal axis, and front and rear faces;
    a rotor extending coaxially in the hollow cavity of the stator, a length of the rotor being greater than a length of the stator, the rotor including a front portion having a front end, the front end including an opening to a central bore in the rotor, both the front end and the front portion of the rotor extending past the front face of the stator; the rotor further including a rear shaft including a stepped diameter extending past the rear face of the stator;

a front support member attached to the front face of the stator, and at least one rear support member attached to the rear face of the stator, the front and rear support members forming a stable mechanical assembly with the stator;

at least one support bearing between the rear shaft of the rotor and a rear support member of the at least one rear support member, the at least one support bearing able to take and resist axial loads;

a front bearing disposed directly between the front support member and the front portion of the rotor; and a position sensor including an encoder configured to sense the actual angular position of the rear shaft of the rotor;

a ball screw drive mechanism including a ball screw nut and a ball screw shaft guided in the ball screw nut, the ball screw nut being arranged in the central bore and in the front portion of the rotor extending past the front face of the stator; the ball screw shaft including a threaded rear portion extending in different lengths in the bore behind said screw nut depending on the angular position of the rotor;

a stationary hollow cylinder attached to a front end of the front support member, the stationary hollow cylinder extending along the longitudinal axis;

an actuator member guided exclusively for axial movement in the hollow cylinder, the actuator member including a central rear part fixed to a front end section of the ball screw shaft to prevent any angular displacement of the ball screw shaft, and the actuator member including a hollow front part; and a pump plunger adaptor fixed in the hollow front part of the actuator member for releasable attachment of a plunger element of the dispensing pump.

* * * * *